US011903883B2

(12) United States Patent
Savich et al.

(10) Patent No.: US 11,903,883 B2
(45) **Date of Patent: *Feb. 20, 2024**

(54) SUPPORT PLATFORM FOR BODY TREATMENT

(71) Applicant: Oakworks, Inc., New Freedom, PA (US)

(72) Inventors: Rebecca Savich, Sherman Oaks, CA (US); Jeffrey Riach, Cockeysville, MD (US)

(73) Assignee: Oakworks, Inc., New Freedom, PA (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/530,678

(22) Filed: Nov. 19, 2021

(65) Prior Publication Data

US 2022/0071829 A1 Mar. 10, 2022

Related U.S. Application Data

(63) Continuation of application No. 15/888,523, filed on Feb. 5, 2018, now Pat. No. 11,207,233, which is a (Continued)

(51) Int. Cl.
*A61G 13/12* (2006.01)
*A61G 13/00* (2006.01)

(Continued)

(52) U.S. Cl.
CPC ......... *A61G 13/121* (2013.01); *A61G 13/009* (2013.01); *A61G 13/105* (2013.01);

(Continued)

(58) Field of Classification Search
CPC .... A61G 13/009; A61G 13/12; A61G 13/121; A61G 13/1245; A61G 13/1235;

(Continued)

(56) References Cited

U.S. PATENT DOCUMENTS 1,617,593 A 2/1927 Hardy
3,226,106 A 12/1965 Johnson et al.

(Continued)

FOREIGN PATENT DOCUMENTS

AU 2009238320 A1 6/2011
DE 29916544 U1 7/2000

(Continued)

OTHER PUBLICATIONS

Braun, Mary Beth, et al., Introduction to Massage Therapy, Lippincott Williams & Wilkins, Copyright 2005, pp. 313-320.

*Primary Examiner* — Ophelia A Hawthorne
(74) *Attorney, Agent, or Firm* — Barley Snyder

(57) ABSTRACT

A support platform for body treatment is provided and includes a supporting frame, a resilient pad, a guide passageway, a cushion and a control assembly. The resilient pad is secured to the supporting frame and includes an upper surface positioned opposite the supporting frame. The guide passageway extends from the upper surface and through the resilient pad toward the supporting frame. The cushion includes a lower surface side and is connected to control assembly so that it vertically positions the lower surface side along the guide passageway.

21 Claims, 10 Drawing Sheets

Related U.S. Application Data continuation of application No. 14/724,881, filed on May 29, 2015, now Pat. No. 9,925,108.

(51) Int. Cl.
*A61G 13/10* (2006.01)
*A61G 13/06* (2006.01)

(52) U.S. Cl.
CPC .............. *A61G 13/12* (2013.01); *A61G 13/06* (2013.01); *A61G 2200/12* (2013.01); *A61G 2200/325* (2013.01)

(58) Field of Classification Search
CPC ....... A47B 7/00; A47C 20/025; A47C 20/026; A47C 15/008
See application file for complete search history.

(56) References Cited

U.S. PATENT DOCUMENTS

| | | | |
|---|---|---|---|
| 3,795,018 A | 3/1974 | Broaded | |
| 3,988,793 A | 11/1976 | Abitbol | |
| 4,051,566 A | 10/1977 | Esquivel | |
| 4,333,638 A | 6/1982 | Gillotti | |
| 4,451,945 A | 6/1984 | Heinz et al. | |
| 4,558,847 A | 12/1985 | Coates | |
| 5,009,170 A | 4/1991 | Spehar | |
| 5,088,475 A | 2/1992 | Steffensmeier | |
| 5,109,558 A | 5/1992 | Di Blasi | |
| 5,425,147 A | 6/1995 | Supplee et al. | |
| 5,438,715 A | 8/1995 | Jackman | |
| 5,652,981 A | 8/1997 | Singer-Leyton et al. | |
| 5,820,573 A | 10/1998 | Ramos | |
| 5,921,696 A | 7/1999 | Gillotti | |
| 5,974,979 A | 11/1999 | Grady et al. | |
| 6,076,213 A | 6/2000 | Chase, Jr. | |
| 6,148,460 A | 11/2000 | Fried et al. | |
| 6,190,338 B1 | 2/2001 | Arndt | |
| 6,684,431 B2 | 2/2004 | Splane, Jr. | |
| 6,763,540 B1 | 7/2004 | Wang | |
| 6,934,988 B1 | 8/2005 | Wetzler et al. | |
| 7,069,609 B2 | 7/2006 | Zheng | |
| 7,127,764 B1 | 10/2006 | Harding et al. | |
| 9,295,602 B2 † | 3/2016 | Savich | |
| 9,925,108 B2 * | 3/2018 | Savich | A61G 13/12 |
| 2006/0031993 A1 | 2/2006 | Riach | |
| 2009/0211584 A1 † | 8/2009 | Savich | |
| 2010/0263125 A1 | 10/2010 | Roleder et al. | |
| 2010/0325798 A1 | 12/2010 | Savich | |

FOREIGN PATENT DOCUMENTS

| | | |
|---|---|---|
| DE | 20 2006 015 210 U1 | 3/2007 |
| JP | 05317381 A | 12/1993 |
| SE | 419160 A | 7/1981 |

* cited by examiner
† cited by third party

SUPPORT PLATFORM FOR BODY TREATMENT

CROSS-REFERENCE TO RELATED APPLICATIONS

This application is a continuation of co-pending application U.S. Ser. No. 15/888,523 filed on Feb. 5, 2018, which claims priority to U.S. Ser. No. 14/724,881 filed on May 29, 2015 that is now issued into U.S. Pat. No. 9,925,108 on Mar. 28, 2018.

FIELD OF THE INVENTION

The present invention relates, in general, to a support platform for body treatment and, more particularly, to such a support platform that has a moveable resilient cushion in an upper surface of the support platform that accommodates shapes, contours and protuberances of the human body.

BACKGROUND

Because the human body has many shapes, contours and protuberances, when an individual lies in a prone position, to rest, relax, sleep or receive treatment, localized discomfort, pain and even injury can result. This problem is exacerbated for the mature female because, while lying face down, the female cannot relax in a natural whole body extending position due to the breasts causing a distortion in body position that is both uncomfortable as well as stressful for various muscle groups and tissue.

The breast tissue is primarily composed of subcutaneous fat and is almost solely supported by suspensory ligaments connecting breast skin to the tissue that rests above the pectorals major. With traditional prior art flat treatment tables, the female patient, while lying prone, will experience uncomfortable and sometimes harmful pressure on all breast tissue, including stretching and tearing of the suspensory ligaments and compressing of the fat cells, often causing swelling to occur. Women with breast augmentations are faced with fear of possible ruptures and certainly severe discomfort.

Whether the individual is seeking a massage for relaxation or for therapeutic treatment, the body needs to be maintained in a relaxed position to achieve the highest degree of success. The thrust of the present invention is to provide a novel support apparatus that will achieve this result. More particularly, the present invention provides an adjustable personal treatment apparatus that is usable by persons of all sizes to enable them to enjoy, without harm, the full healthful benefits of proper and necessary massage and therapy.

Part of the reason that the problems described above have not been solved is that often the designers of traditional mattresses or, for instance, massage tables, keep them flat and ignore the problems described above. Also, the designers of tables or mattress materials have tried to address the issue of comfort, pain or injury, but; because of the degree of contour of the human body, changing the material of the mattress or the table, in and of itself, often is not alone enough to provide both the desired results when the present invention is used in body treatment practices.

While others have attempted to address some of the problems described above, there remains a need for an automated, adjustable body part and contour comfort system. The structures disclosed in the prior art suffer from one or more of the following shortcomings: (a) lack of adjustable recessed cup area; (b) requirement that the patient stand during treatment; (c) lack of portability; and (d) limited adjustability.

SUMMARY

A support platform for body treatment, constructed in accordance with the present invention is provided and includes a supporting frame, a resilient pad, a guide passageway, a cushion and a control assembly. The resilient pad is secured to the supporting frame and includes an upper surface positioned opposite the supporting frame. The guide passageway extends from the upper surface and through the resilient pad toward the supporting frame. The cushion includes a lower surface side and is connected to control assembly so that it vertically positions the lower surface side along the guide passageway.

BRIEF DESCRIPTION OF THE DRAWINGS

The present invention will be explained in greater detail in the following, with reference to the appended drawings, in which.

DETAILED DESCRIPTION OF THE EMBODIMENT(S)

Hereinafter, embodiments of the invention will be described in detail with reference to the accompanying drawings. However, the invention is not limited to the embodiments described herein.

Figure 1:
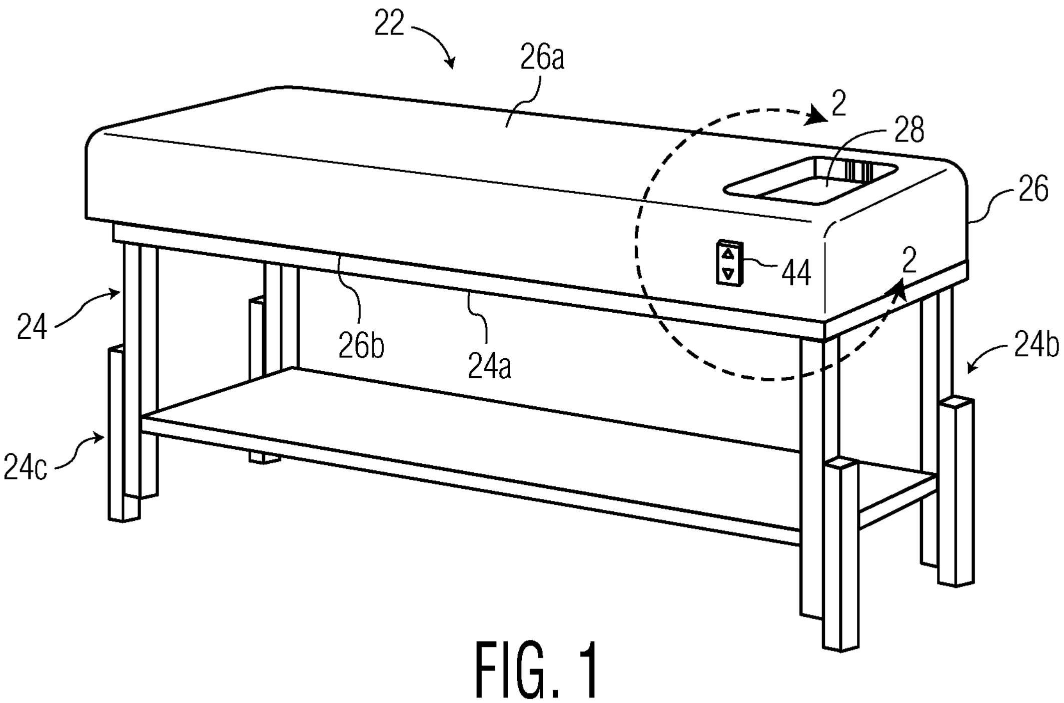
FIG. 1 is a perspective view of a support platform for body treatment having a control assembly according to the present invention.
Figure 2:
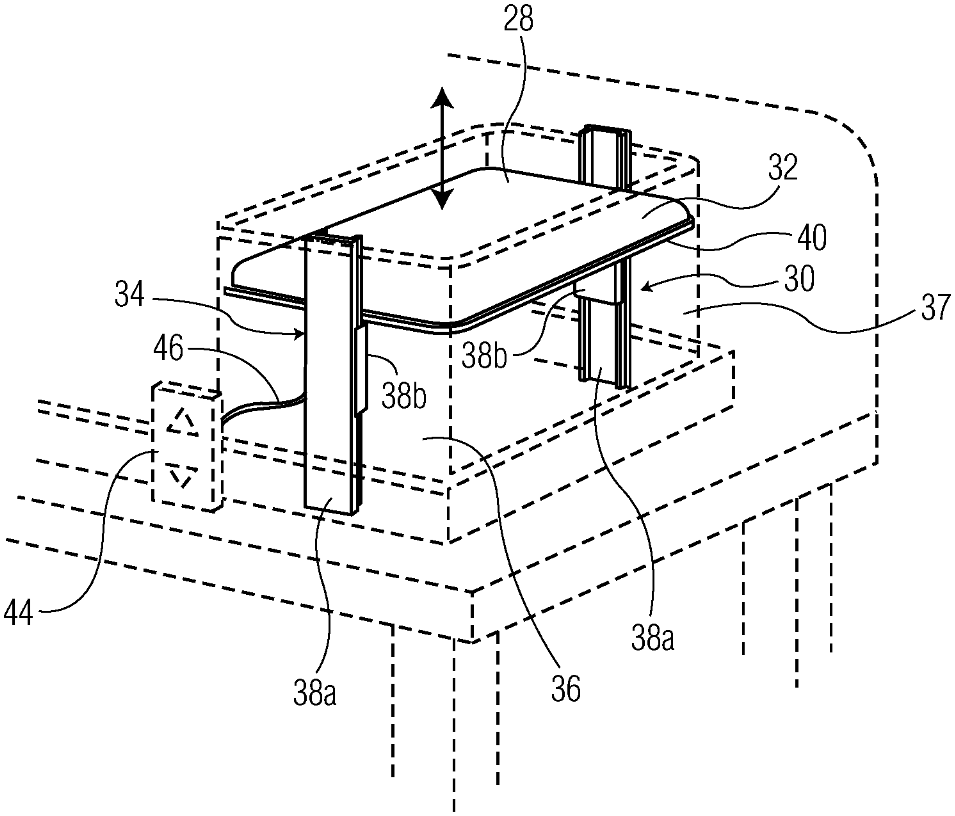
FIG. 2 is a partial perspective view of the support platform of FIG. 1, showing the control assembly.

Referring first to FIGS. 1 and 2, a support platform 22, according to the present invention, is shown and may be used for supporting an individual in a prone position. The support platform 22 includes a supporting frame 24 having an upper frame 24*a* to which a pair of forward, transversely spaced, downwardly extending legs 24*b* are connected and to which a pair of rearward, transversely-spaced, downwardly extending legs 24*c* are also connected. An elongated, resilient body cushion 26 is secured to and supported by supporting frame 24 and includes opposing upper and lower surfaces 26*a* and 26*b*. As best seen in FIG. 1, upper surface 26*a* of body cushion 26 has a receiving chamber 28 for receiving the breasts of the individual being treated.

Forming an important aspect of the support platform 22 of the present invention is a control assembly 30 that has a breast support cushion 32 disposed within the receiving chamber 28. The control assembly 30 includes a breast cushion positioning mechanism 34 for moving the breast support cushion 32 within receiving chamber 28 from a first elevated position to a second lowered position. As shown in FIG. 2, a portion of the breast cushion positioning mechanism 34 is connected to the inner sidewalls 36 and 37 of receiving chamber 28 and is disposed below the upper surface 26*a* of the resilient body cushion 26.

The breast cushion positioning mechanism 34 includes a pair of linear motor assemblies 38 that include elongated tracks or slides 38*a* that, in the manner shown in FIG. 2, are interconnected with the side walls 36 and 37, respectively, of the receiving chamber 28. Each of the linear motor assemblies also includes a combination electric motor (not shown) and moving carriage 38*b* that is mounted for movement along a selected one of the tracks. The breast support cushion 32 is carried by a cushion support plate 40 that is positioned on and attached to the moving carriage 38*b*. When the motors of the linear motor assemblies are energized through operation of a switch 44 that is mounted on the side of the resilient body cushion 26 and interconnected with the motors by a conduit 46, the breast support cushion can be controllably moved upwardly and downwardly within the receiving chamber 28 in a manner to provide optimum support to the breasts of the patient. The linear motor assemblies 38 can be obtained from a number of sources, including the Parker Hannifin Corporation of Rohnert Park, Calif. and the Tecnotion, B.V. Company of the Netherlands.

In using the invention shown in FIGS. 1 and 2, the linear motor assemblies 38 are operated in a manner to move the breast support cushion 32 upwardly and downwardly within the receiving chamber 28. As a result, when the patient is lying in a prone position on the resilient body cushion 26, the patient's breasts may be positioned within the receiving chamber 28. Through operation of the switch 44, the breast support cushion 32 can be raised to a position wherein the breasts of the patient are comfortably supported by the breast support cushion 32. With the patient thusly positioned on the support table, massage or similar therapeutic manipulation of the patient can be accomplished without undue pressure being exerted upon the breasts of the patient.

Figure 3:
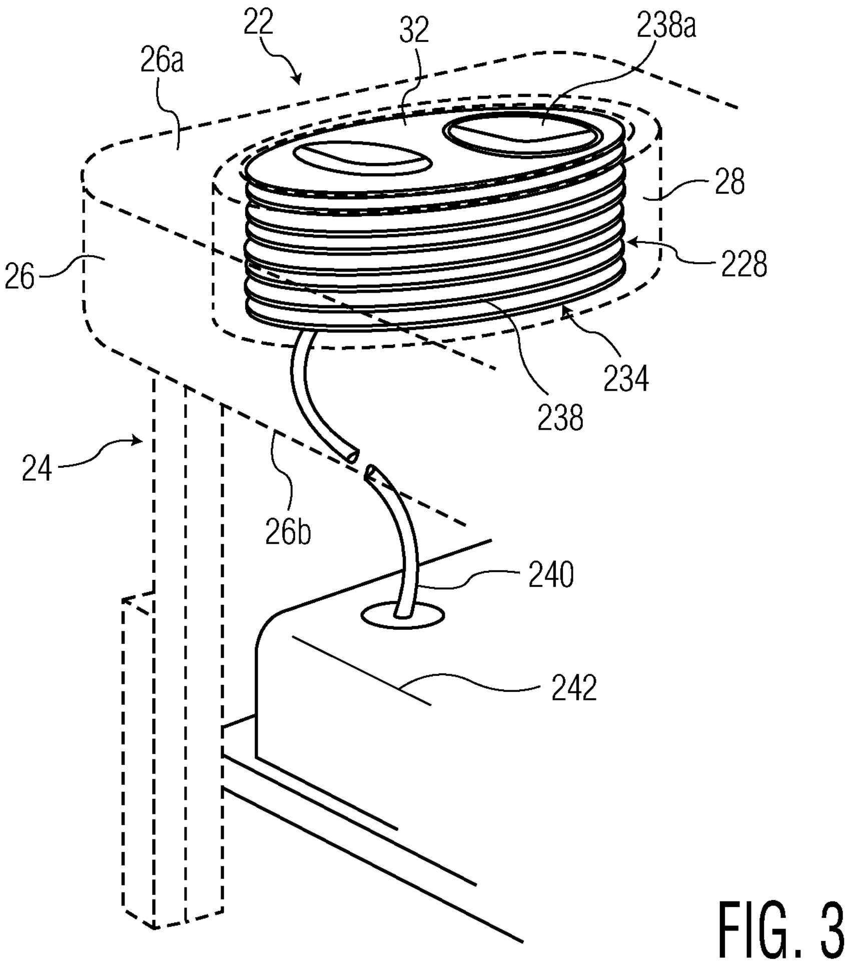
FIG. 3 is a partial perspective view of another control assembly according to the present invention.
Figure 4:
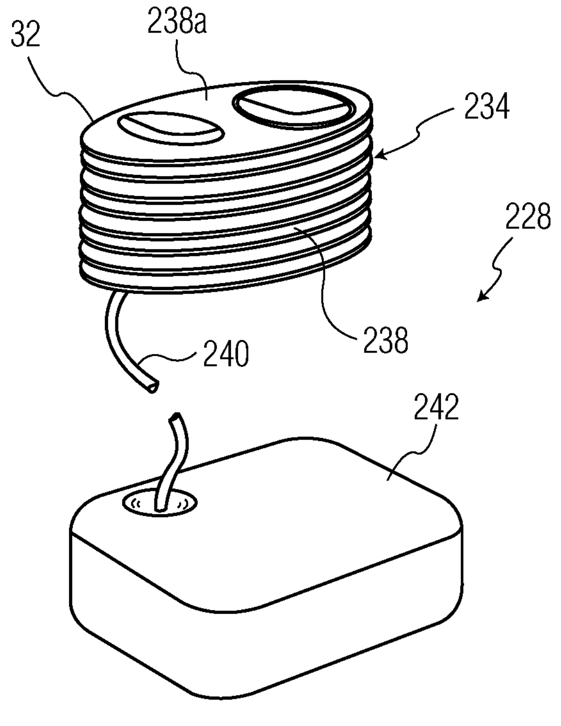
FIG. 4 is another perspective view of the control assembly of FIG. 3.

Turning next to FIGS. 3 and 4, another support platform 22 according to the present invention will be described. The support platform 22 is similar in many respects to the earlier support platform 22 illustrated in FIGS. 1 and 2. Therefore, like reference numerals are used in FIGS. 3 and 4 to identify like components of FIGS. 1 and 2.

The support platform 22 includes a supporting frame 24 that is substantially similar in construction and operation to the supporting frame previously described and functions to support a resilient body cushion 26 having opposing upper and lower surfaces 26*a* and 26*b*. As best seen in FIG. 3, an upper surface 26*a* of the resilient body cushion 26 is provided with a receiving chamber 28 for receiving the breasts of the individual being treated.

As shown, another control assembly 230 according to the present invention is provided and is positioned within receiving chamber 28 of resilient body cushion 26. The control assembly 28 includes a breast cushion 32 and a breast cushion positioning mechanism 234 for maintaining the breast cushion 32 at an optimum position within receiving chamber 28.

As shown in FIG. 4, the breast cushion positioning mechanism 234 includes a yieldably deformable, generally elliptically shaped fluid containing bellows 238 and an elongated tube 240 connected to the bellows 238. The upper surface of bellows 238*a* that supports the breast cushion 32 is movable from a first extended position to a second collapsed position. Also forming a part of the control assembly 230 is a plenum chamber 242 of conventional construction to which the tube 240 is interconnected. In the shown embodiment, the bellows 238 is pressurized with air that is transferred to the plenum chamber 242 via tube 240 when the bellows 238 is collapsed due to a downward pressure being exerted thereon by the breasts of a patient lying prone upon the resilient body cushion 226. With this construction, air under pressure within the plenum chamber 242 will resist collapsing of the bellows so that the breast support cushion 232 will be continuously urged into gentle contact with the breasts of the patient thereby comfortably supporting the breasts during the massage or therapeutic manipulation. The construction of the bellows 238, the construction of the plenum chamber 242 and the manner of their interconnection by tube 240 is well understood by those skilled in the art.

Next, with respect to FIGS. 5 through 10, another support platform 50, constructed in accordance with the invention, for supporting an individual in a prone or supine position will be described. Again, like reference numerals are used in FIGS. 5-10 to identify like components of FIGS. 3 and 4.

As shown, the support platform 50 includes a foldable support frame 54 that functions to support an elongated resilient body pad 56 that includes first and second sections 58 and 60. A first section 58 has a forward portion 58*a* having opposing upper and lower surfaces 62 and 64 and a guide passageway 66 that is generally oval shaped in FIGS. 5, 9, 9A and 9B.

Figure 5:
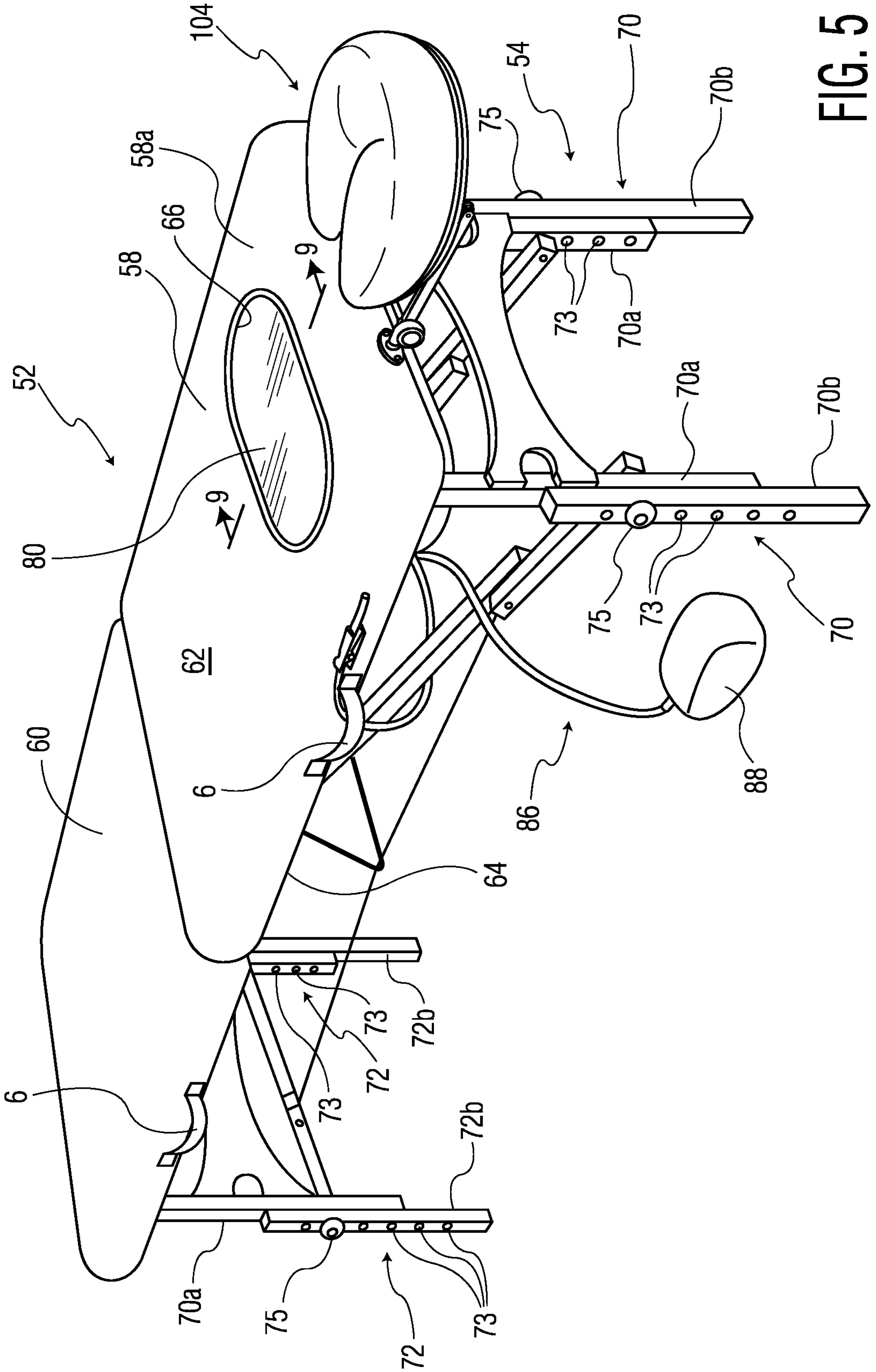
FIG. 5 is a perspective view of another support platform for body treatment having a control assembly according to the present invention.
Figure 6:
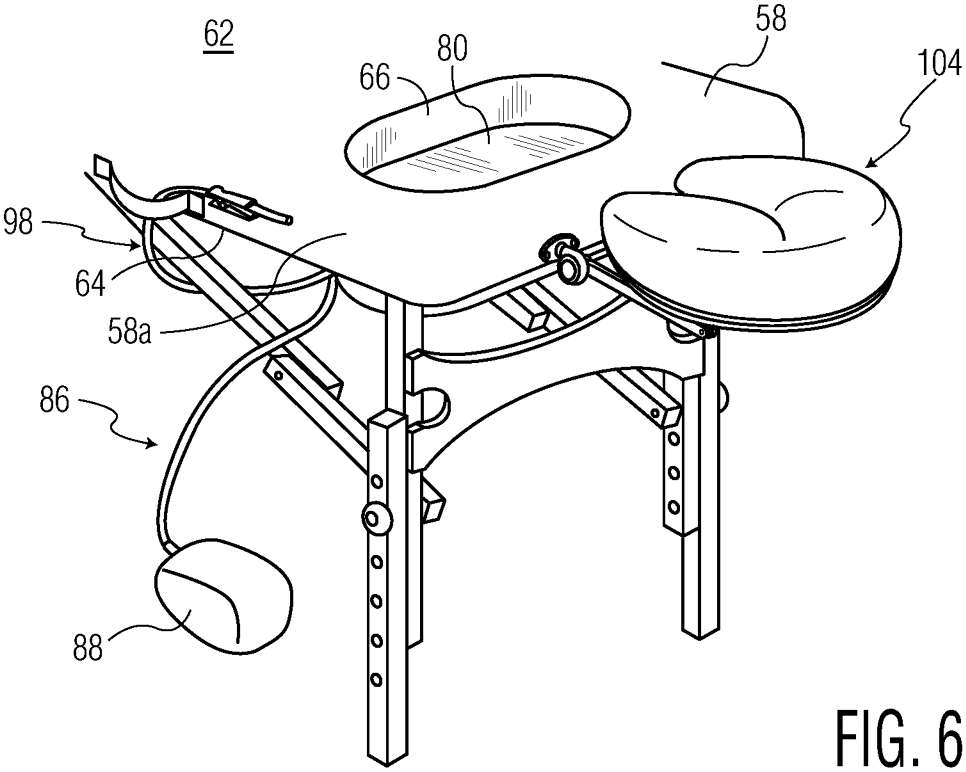
FIG. 6 is a partial perspective view of the support platform of FIG. 5, showing movement of the control assembly.

As indicated in FIG. 5, the forward portion of the support frame 54 is provided with downwardly extending adjustable front leg assemblies 70, while the rearward portion of the support frame is provided with downwardly extending adjustable rear leg assemblies 72.

A patient support cushion assembly numeral 74 is connected to the forward portion 58*a* of first section 58 of the resilient body pad 56. The patient support cushion assembly 74 includes a housing 76 having an internal chamber 76*a* that is in communication with the guide passageway 66 and is positioned at the forward portion of the first section 58 of the resilient body pad 56. Also, an inflatable, deflatable airbag 78 is disposed within the internal chamber of the housing 76. The airbag 78 is movable relative to housing 76 between the first partially collapsed configurations shown in FIG. 9A, to the second fully expanded configuration shown in FIG. 9B. When the airbag 78 is in its normal at-rest configuration, it is in the position shown in FIGS. 5 and 9.

A resiliently deformable patient support cushion 80 is provide with the patient support cushion assembly 74 and is generally oval shaped in cross-section in the shown embodiment. However, one skilled in the art should appreciate that other design and configurations are possible. The support cushion 80, which includes yieldably deformable side and top walls 80*b* (FIG. 7), is operably associated with the airbag 78 and is movable from a first lowered position shown in FIG. 9A wherein the support cushion 80 is disposed within the guide passageway 66 at a location below the upper surface of the first section 58, to a second upraised position shown in FIG. 9, and to a third position shown in FIG. 9B, wherein the support cushion 80 is positioned a substantial distance above the upper surface 58*a* of the first section 58. More particularly, the support cushion 80 is coupled with the airbag 78 by means of the plurality of generally "S" shaped coupling members 82 that are of the configuration shown in FIGS. 9 and 10.

Figure 8:
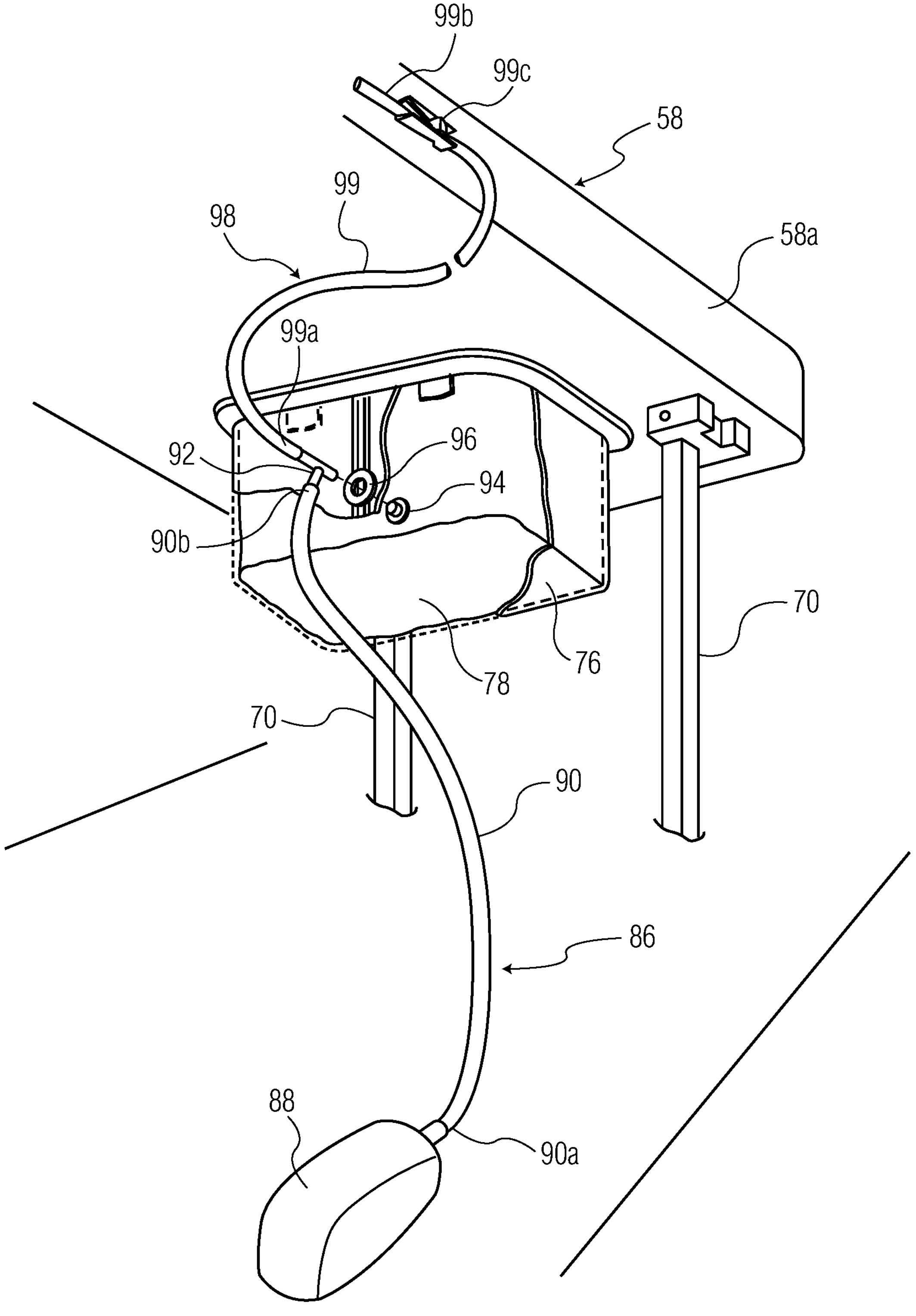
FIG. 8 is partial bottom perspective view of the support platform of FIG. 5.
Figure 9B:
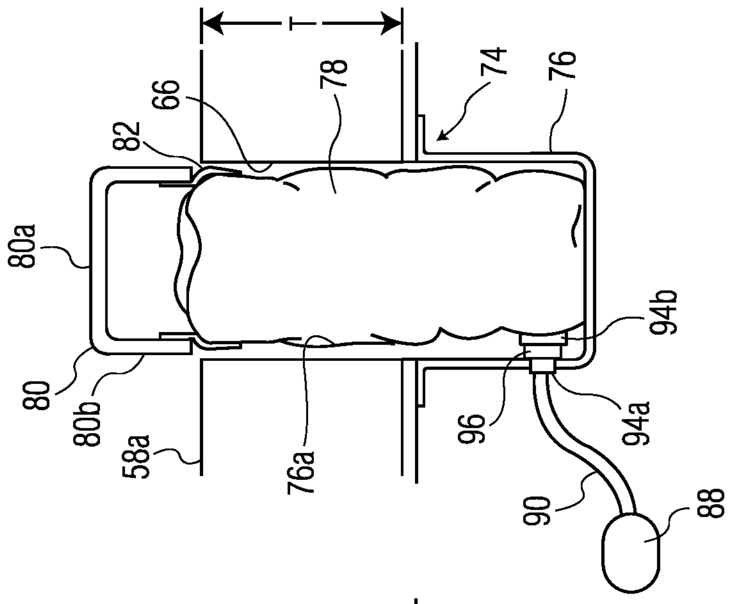
FIG. 9B is a partial section view of the cushion assembly of FIG. 7.
Figure 9A:
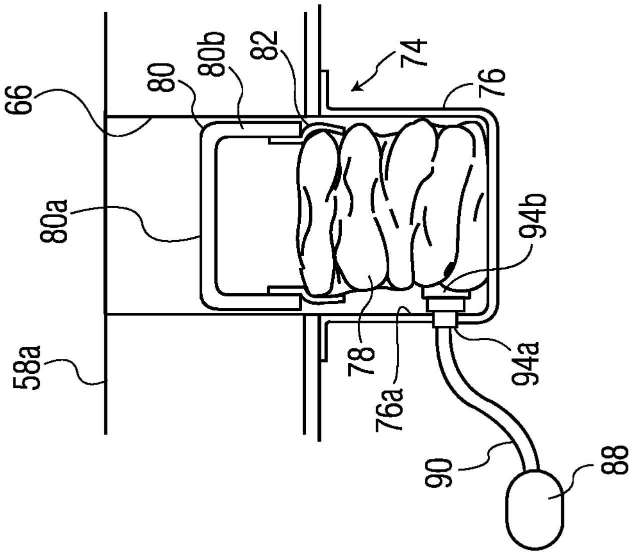
FIG. 9A is a partial section view of the cushion assembly of FIG. 6.
Figure 9:
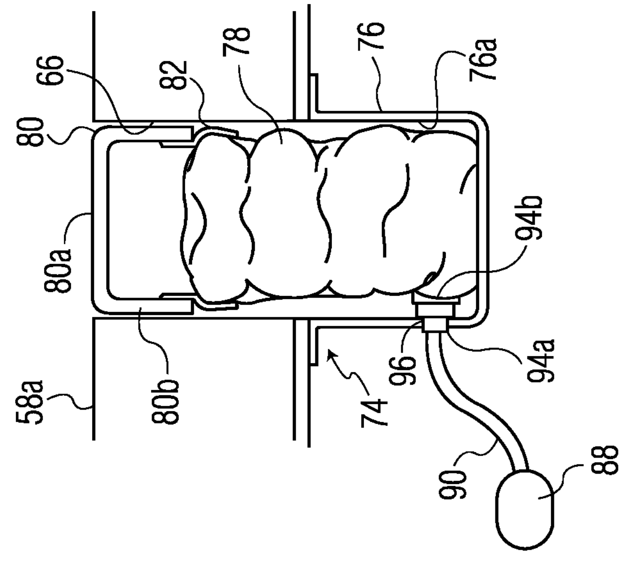
FIG. 9 is a partial section view of the cushion assembly taken along line 9-9 of FIG. 5.
Figure 10:
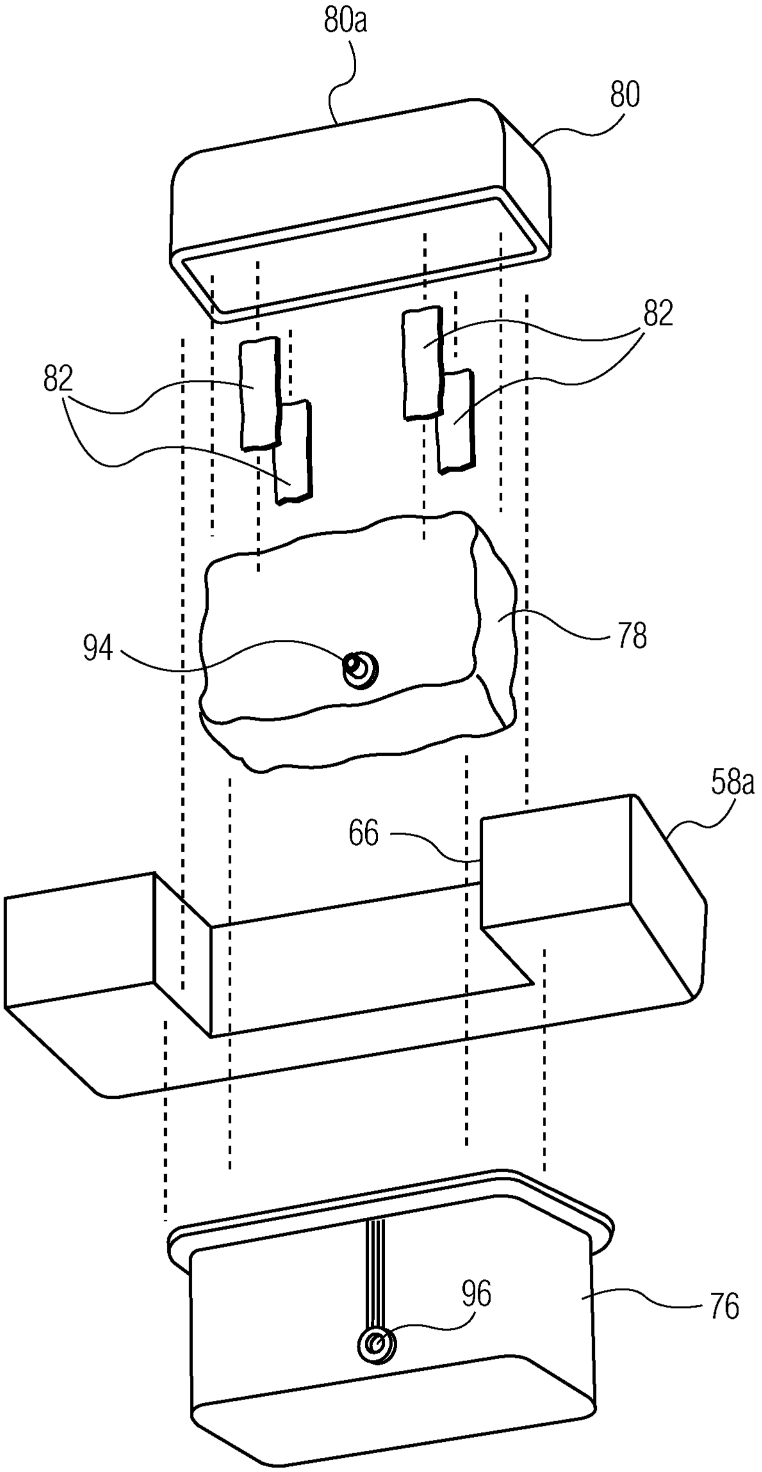
FIG. 10 is an exploded perspective view of the cushion assembly of the FIG. 5.

A pump assembly 86 is connected to the airbag 78 for moving the airbag between the first partially collapsed configuration shown in FIG. 9A and the expanded configurations shown in FIGS. 9 and 9B that includes an airline 90 that interconnects the pump assembly 88 with the inflatable, deflatable airbag 78. The airline 90 has a first end 90*a* that is connected to the pump assembly 88 and a second end that is connected to one leg of a "T" connector 92 (FIG. 8). Another leg of the "T" connector is connected to the inlet 94*a* of an airbag connector 94 that is disposed within an opening 96 formed in the side wall of airbag housing 76. The airbag connector 94 has an outlet 94*b* that is in communication with the interior of the airbag 78 so that air under pressure generated by the foot pump will travel through the airline 90, through the airbag connector and into the interior of the airbag in a manner to controllably inflate the airbag.

A vent line assembly 98 is also provided and is connected to airline 90 for controllably deflating the airbag 78. In the embodiment shown, the vent line assembly 98 includes a vent line 99 having a first end portion 99*a* that is connected to one leg of the "T" connector 92 and a second end portion 99*b* that is secured to the side of the resilient body pad 56 by means of a conventional line clamp 99*c* which can be used to control the flow of air through vent line 99 (see FIG. 8).

The support platform 50 further includes a head support assembly 97 that is connected to the forward portion of the first section 58 of the resilient body pad 56 (FIG. 5). When the patient is in a prone position on the resilient body pad, the head support assembly 97 functions to support the face of the patient when the patient is lying face down or the head of the patient when the patient is lying on his or her back.

In using the present invention, the apparatus is first erected from the collapsed, folded configuration (not shown) into the operable configuration illustrated in FIG. 5. Hand straps 6 are provided on one side of the resilient body pad 56 to assist in transporting the apparatus.

The height of the platform can be adjusted by appropriately manipulating the downwardly extending adjustable front leg assemblies 70 and the downwardly extending adjustable rear leg assemblies 72. This is accomplished by moving the second portions 70*b* and 72*b* of the front and rear leg assemblies 70, 72 upwardly or downwardly, relative to the first portions 70*a* and 72*a* of the leg assemblies (FIG. 5).

As shown in FIG. 5, the first and second portions of the front and rear leg assemblies 72 are provided with vertically spaced apart pad receiving apertures 73 that are adapted to receive locking pins 75. Upon the sequential removal of the locking pins 75, the second portions of the leg assemblies 70*b*, 72*b* can be moved from a first position to a second position, to controllably adjust the overall length of each of the leg assemblies 70, 72 and thereby adjust the height of the support platform 50. When the desired length of the leg assemblies 70, 72 is achieved, the locking pins 75 can be reinserted into the receiving apertures 73 to hold the first and second leg portions 70*a*, 70*b*, 72*a*, and 72*b* securely in position.

With a starting configuration shown in FIG. 5, an upper surface 80*a* of the resiliently deformable patient support cushion 80 is typically flush with the upper surface of the resilient body pad 56. Due to the resilient nature of the airbag 78 that supports the support cushion 80, while lying prone, any portion of the patient's body that protrudes outwardly, as for example the breasts of the patient, that is positioned within the guide passageway 66 will, upon operation of the line clamp 99*c*, uniquely cause the support cushion 80 move telescopically downwardly within the guide passageway 66 to a lowered position, such as the position shown in FIG. 6, so as to avoid any discomfort to the patient.

Figure 7:
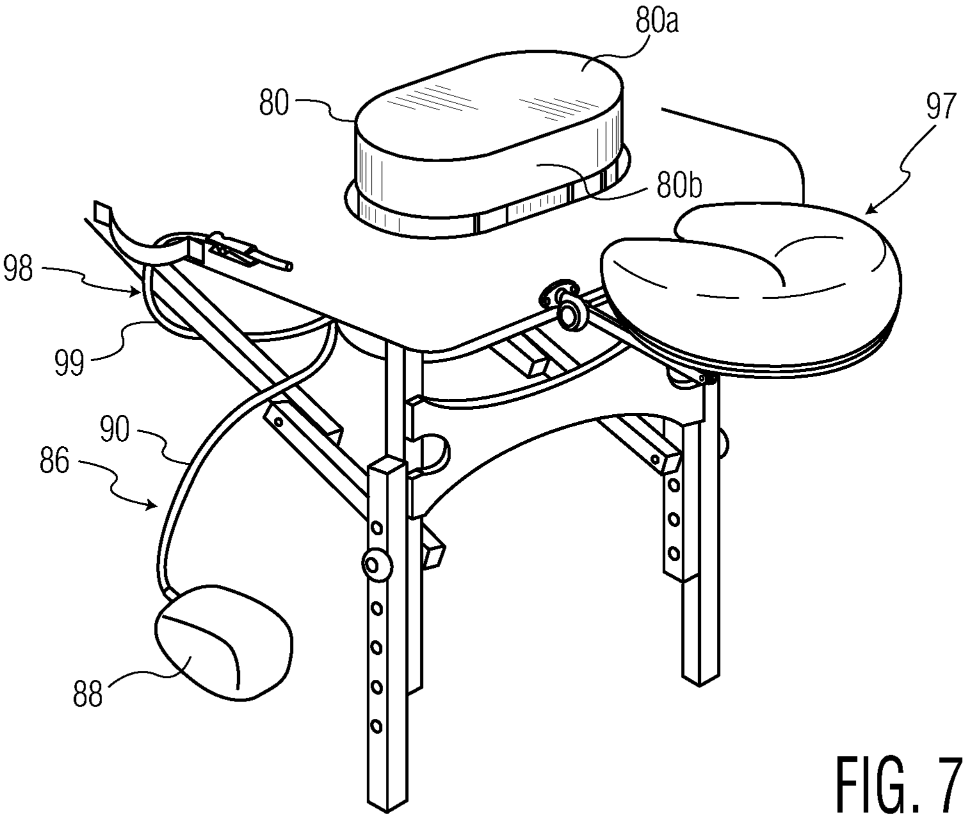
FIG. 7 is another partial perspective view of the support platform of FIG. 5, showing further movement of the control assembly.

Similarly, when the patient is in a supine position and with line clamp 99*c* closed, operation of the foot pump 88 by the foot of the caregiver will cause the support cushion 80 to move upwardly relative to the surface of the resilient body pad 56 in the manner illustrated in FIG. 7. By way of example, when the patient's upper back is positioned over the pad, this controlled upward movement of the resiliently deformable support cushion 80 raises the patient's chest and enables the accomplishment of a more effective and highly satisfying massage. Because of the unique positioning of the airbag within the guide passageway 66 and the ability to controllably inflate the airbag, the support cushion 80 can be raised to any degree desired by the caregiver, including into the position shown in FIG. 7 wherein the upper surface 80*a* of the support cushion 80 resides above the surface of the resilient body pad 56 by distance approximately one half the thickness "T" of the resilient body pad 56 (see FIG. 9B).

When the massage is complete, the forward and rearward legs can be pivoted in a direction toward the lower surface of the resilient body pad 56 and the resilient body pad 56 can then be folded to form a compact unit that can be easily transported and stored.

Next, with respect to FIGS. 11 through 16, another control assembly 100 for the support platform 50 of the present invention for supporting an individual in a prone or supine position will be described. Again, like numerals are used in FIGS. 11-16 to identify like components of the support platform 50 shown in FIGS. 3 and 4.

The control assembly 100 includes a lower support structure 110, an upper support platform 120, a plurality of extension arms 140, a plurality of horizontal supports 160, a lifting mechanism 170, and a control mechanism 180.

As shown in FIGS. 11 and 13-16, the lower support structure 110 includes a pair of lower support arms 112 and a plurality of support fasteners 118.

Each lower support arm 112 is an elongated rigid beam having a rectangular shape. However, one skilled in the art should appreciate other designs are possible, including but not limited to round, tubular, hexagonal, and triangular configurations. In the embodiment shown, each lower support arm 112 is made of metal, such as steel, aluminum, or other rigid strong material. However, one skilled in the art should appreciate that other materials could be used. Each lower support arm 112 includes a lower pivot receiving passageway 114, a lower slide receiving groove 116, and a plurality of lower fastener receiving passageways 117. In the embodiment shown, the lower pivot receiving passageway 114 is a hole that extends from an inner surface side 112*a* to an outer surface side 112*b* of the lower support arm 112. More particularly, the lower pivot receiving passageway 114 extends completely through the lower support arm 112. However, one skilled in the art should appreciate other designs are possible, including a blind pocket hole that does not extend there through. In the embodiment shown, the lower slide receiving groove 116 is an elongated groove extending along a length of the lower support arm 112. The lower slide receiving groove 116 extends from the inner surface side 112*a* to the outer surface side 112*b* of the lower support arm 112. More particularly, the lower slide receiving groove 116 extends completely there through the lower support arm 112. As shown, the pair of lower support arms 112 positioned parallel to each other. In the shown embodiment, a length of each lower support arm 112. Each lower fastener receiving passageways 117 is a hole that extends from an upper surface side 112*c* to a lower surface side 112*d* of the lower support arm 112. More particularly, the lower fastener receiving passageway 117 extends completely through the lower support arm 112. The lower fastener receiving passageway 117 is positioned at an end of each lower support arm 112 in the embodiment shown.

In the embodiment shown, each support fastener 118 is a screw that attaches to the support platform 50 through the lower fastener receiving passageway 117. However, one skilled in the art should appreciate that other fasteners or an adhesive could be used to attach the lower support arm 112 to the support platform 50, such as latches, nuts and bolts, Velcro, and removable adhesives.

As shown in FIGS. 11 and 13-16, the upper support structure 120 includes a pair of upper support arms 122 and a plurality of support fasteners 128.

Each upper support arm 122 is an elongated rigid beam having a rectangular shape. In the embodiment shown, each upper support arm 122 is made of metal, such as steel, aluminum, or other rigid strong material. However, one skilled in the art should appreciate that other materials could be used. Each upper support arm 122 includes an upper pivot receiving passageway 124, an upper slide receiving groove 126, and a plurality of upper fastener receiving passageways 127. In the embodiment shown, the upper pivot receiving passageway 124 is a hole that extends from an inner surface side 122*a* to an outer surface side 122*b* of the upper support arm 122. More particularly, the upper pivot receiving passageway 124 extends completely there through the upper support arm 122. In the embodiment shown, the upper slide receiving groove 126 is an elongated groove extending along a length of the upper support arm 122. The upper slide receiving groove 126 extends from the inner surface side 122*a* to the outer surface side 122*b* of the upper support arm 122. More particularly, the upper slide receiving groove 126 extends completely there through the upper support arm 122. As shown, the pair of upper support arms 122 positioned parallel to each other and the pair of lower support arms 112. In the embodiment shown, a width $W_1$ of the pair of upper support arms 122 (measured from the outer surface side 122*b* of both upper support arms 122) is smaller than a width $W_0$ of the pair of lower support arms 112 (measured from the inner surface side 112*a* of both lower support arms 112). In the shown embodiment, a length $L_u$ of the pair of upper support arms 122 is smaller than a length $L_1$ of each lower support arm 112, as well as a length $L_c$ of the deformable support cushion Each upper fastener receiving passageways 127 is a hole that extends from an upper surface side 122*c* to a lower surface side 122*d* of the upper support arm 122. More particularly, the upper fastener receiving passageway 127 extends completely there through the upper support arm 122. The upper fastener receiving passageways 127 are positioned at opposing ends of each upper support arm 122 in the embodiment shown.

In the embodiment shown, each support fasteners 128 is a screw that attaches to deformable support cushion 80 through the upper fastener receiving passageway 127. However, one skilled in the art should appreciate that other fasteners or adhesive could be used to attach the upper support arm 122 to deformable support cushion 80, such as latches, nuts and bolts, Velcro, and removable adhesives.

As shown in FIGS. 11, 13, 14, and 15, the plurality of extension arms 140 includes a pair of outer extension arms 142 and a pair of inner extension arms 152.

Each outer extension arm 142 is an elongated rigid beam having a rectangular shape. In the embodiment shown, the outer extension arm 142 is made of metal, such as steel, aluminum, or other rigid strong material. However, one skilled in the art should appreciate that other materials could be used.

The outer extension arm 142 includes an end pivot receiving section 144, a middle pivot receiving section 146, and a slide receiving section 148. In the embodiment shown, the end pivot receiving section 144 is a hole that extends from an inner surface side 142*a* to an outer surface side 142*b* of the outer extension arm 142. More particularly, the end pivot receiving section 144 extends completely there through the outer extension arm 142. In the embodiment shown, the middle pivot receiving section 146 is a hole that extends from the inner surface side 142*a* to the outer surface side 142*b* and extends completely there through the outer extension arm 142. In the embodiment shown, the slide receiving section 148 is a hole that extends from the inner surface side 142*a* to the outer surface side 142*b* and extends completely there through the outer extension arm 142. In the embodiment shown, the end pivot receiving section 144 is positioned at a lower end of the outer extension arm 142, while the slide receiving section 148 at an upper end of the outer extension arm 142, opposite the end pivot receiving section 144. The middle pivot receiving section 146 is positioned between the end pivot receiving section 144 and the slide receiving section 148 and, more particularly, proximate to a middle portion of the outer extension arm 142. As shown, the outer extension arms 142 are positioned parallel to each other.

Each inner extension arm 152 is an elongated rigid beam having a rectangular shape. In the embodiment shown, the inner extension arm 152 is made of metal, such as steel, aluminum, or other rigid strong material. However, one skilled in the art should appreciate that other materials could be used.

The inner extension arm 152 includes an end pivot receiving section 154, a middle pivot receiving section 156, and a slide receiving section 158. In the embodiment shown, the end pivot receiving section 154 is a hole that extends from an inner surface side 152*a* to an outer surface side 152*b* of the inner extension arm 152. More particularly, the end pivot receiving section 154 extends completely there through the inner extension arm 152. In the embodiment shown, the middle pivot receiving section 156 is a hole that extends from the inner surface side 152*a* to the outer surface side 152*b* and extends completely there through the outer extension arm 142. In the embodiment shown, the slide receiving section 158 is a hole that extends from the inner surface side 152*a* to the outer surface side 152*b* and extends completely there through the inner extension arm 152. In the embodiment shown, the end pivot receiving section 154 is positioned at an upper end of the inner extension arm 152, while the slide receiving section 158 at a lower end of the inner extension arm 152, opposite the end pivot receiving section 154. The middle pivot receiving section 156 is positioned between the end pivot receiving section 154 and the slide receiving section 158 and, more particularly, proximate to a middle portion of the inner extension arm 152. As shown, the inner extension arms 152 are positioned parallel to each other.

In the embodiment shown, a width $W_i$ of the pair of inner extension arms 152 (measured from the outer surface side 152*b* of both inner extension arms 152) is smaller than a width $W_o$ of the pair of outer extension arms 142 (measured from the inner surface side 142*a* of both outer extension arms 142). As shown, the outer extension arms 142 and the inner extension arms 152 are positioned in a scissor-type manner, wherein the outer extension arms 142 and the inner extension arms 152 cross each other around a substantial middle section of the outer extension arms 142 and the inner extension arms 152. However, it is possible that the support arms 14 be positioned such that they may act as a cantilever lift (i.e. powered), in a way which makes it easy and fast to lift a collapsible massage table no matter the size.

Figure 13:
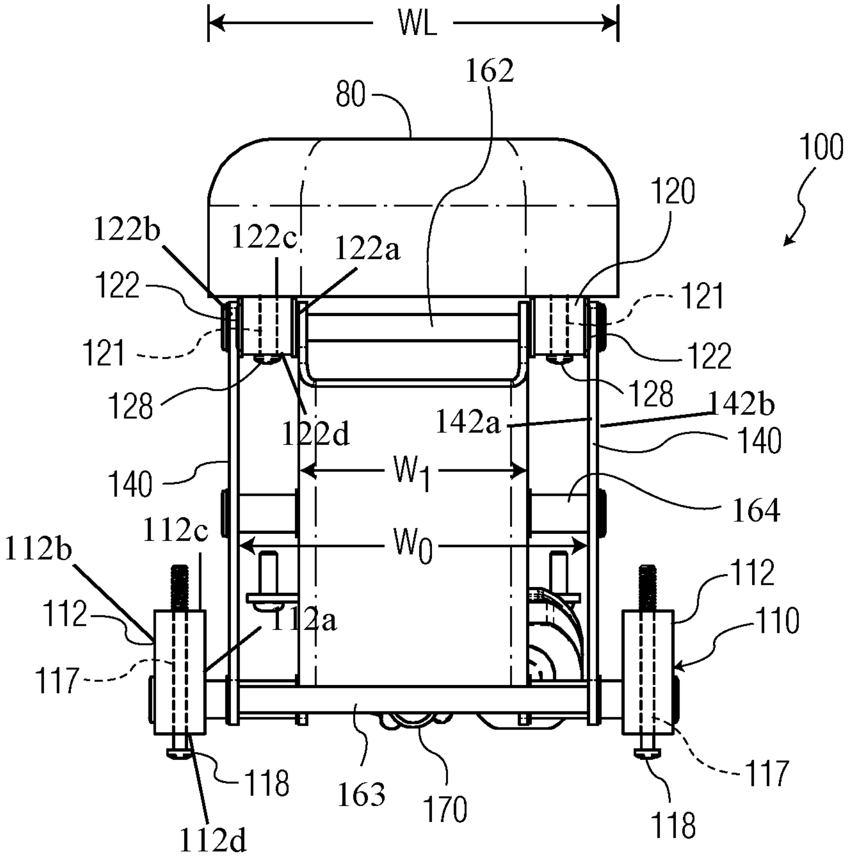
FIG. 13 is side view of the control assembly of FIG. 11, showing movement thereof.
Figure 14:
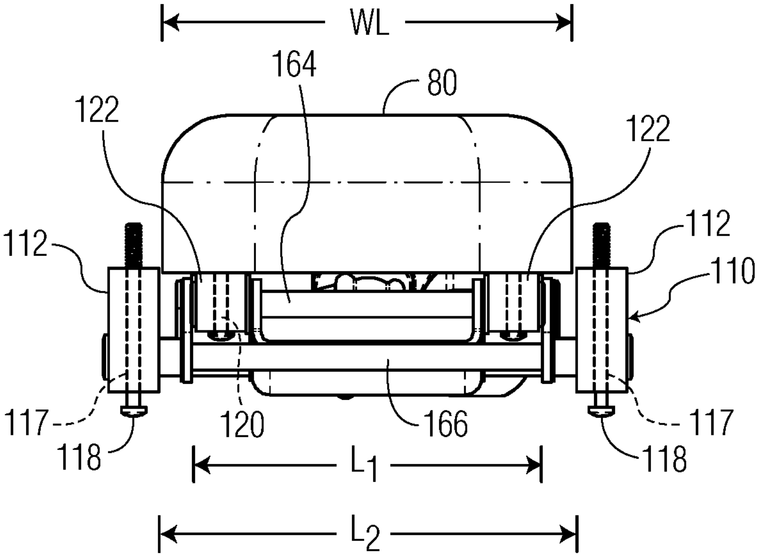
FIG. 14 is side view of the control assembly of FIG. 11, showing further movement thereof.
Figure 15:
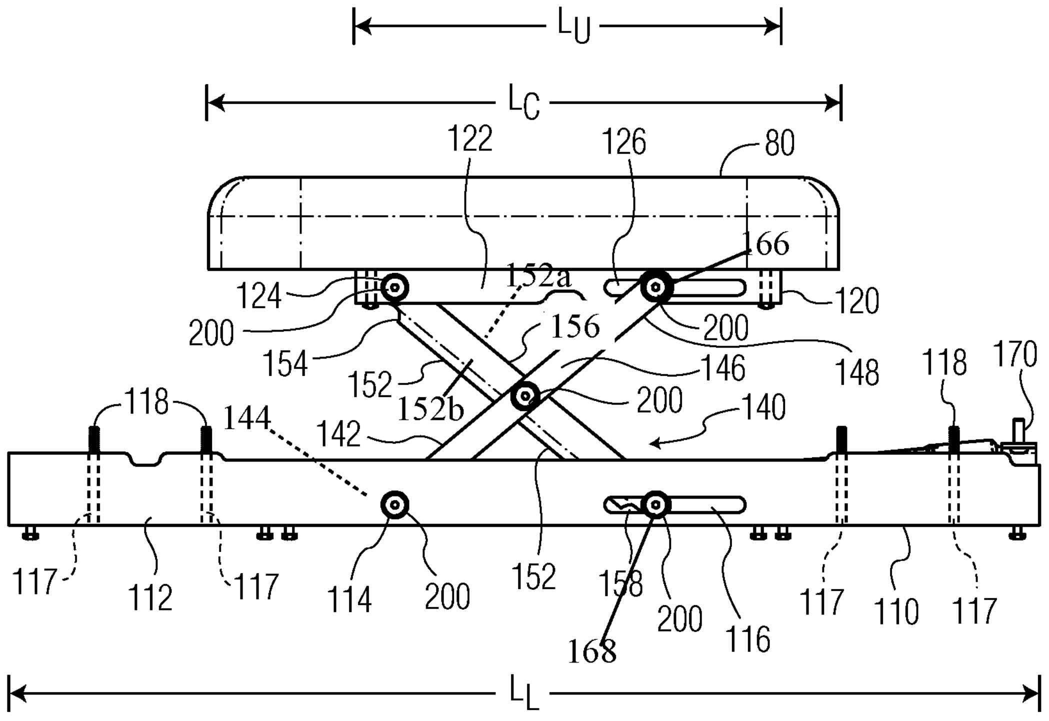
FIG. 15 is front view of the control assembly of FIG. 13.
Figure 16:
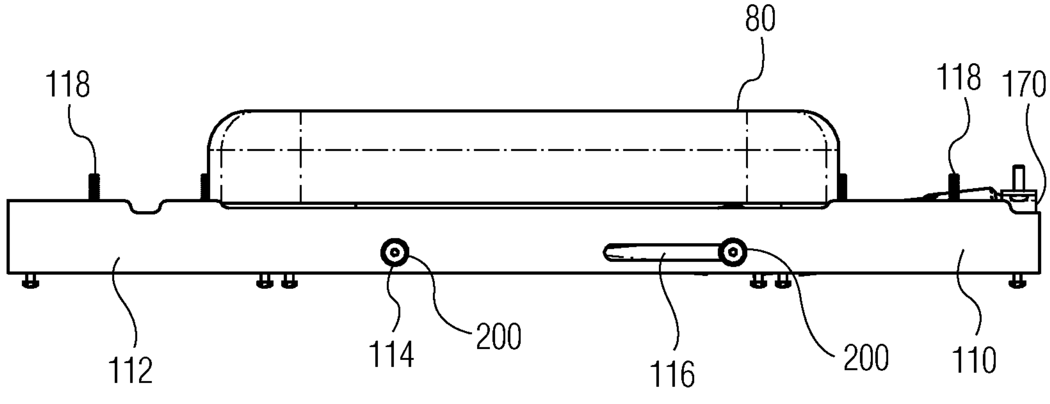
FIG. 16 is front plan view of the control assembly of FIG. 14.

Now with reference to FIGS. 11, 13, and 14, the plurality of horizontal supports 160 will be described. As shown, the plurality of horizontal supports 160 includes an upper rotation support 162, a lower rotation support 163, and a middle rotation support 164, an upper slide support 166, and a lower slide support 168.

The upper rotation support 162 is an elongated rigid rod shaped support. In the embodiment shown, the upper rotation support 162 is made of metal, such as steel, aluminum, or other rigid strong material. However, one skilled in the art should appreciate that other materials could be used. The lower rotation support 163 is an elongated rigid rod shaped support. In the embodiment shown, the lower rotation support 163 is made of metal, such as steel, aluminum, or other rigid strong material. However, one skilled in the art should appreciate that other materials could be used. The upper rotation support 162, the lower rotation support 163, and the middle rotation support 164 include a fastener receiving mechanism (not shown), such as a threaded receiving wall for engagement with a fastener (i.e. screw or bolt), positioned at both ends thereof. In the shown embodiment, the upper rotation support 162 is shorter than the lower rotation support 163.

The middle rotation support 164 is an elongated rigid rod shaped tubular support. In the embodiment shown, the middle rotation support 164 is made of metal, such as steel, aluminum, or other rigid strong material. However, one skilled in the art should appreciate that other materials could be used.

The upper slide support 166 is an elongated rigid rod shaped support. In the embodiment shown, the upper slide support 166 is made of metal, such as steel, aluminum, or other rigid strong material. However, one skilled in the art should appreciate that other materials could be used. The lower slide support 168 is an elongated rigid rod shaped support. In the embodiment shown, the lower slide support 168 is made of metal, such as steel, aluminum, or other rigid strong material. However, one skilled in the art should appreciate that other materials could be used. Both the upper slide support 166 and the lower slide support 168 include a fastener receiving mechanism (not shown), such as a threaded receiving wall for engagement with a fastener (i.e. screw or bolt), positioned at both ends thereof. In the shown embodiment, a length $L_1$ of the upper slide support 166 is shorter than a length $L_2$ of lower slide support 168.

Figure 11:
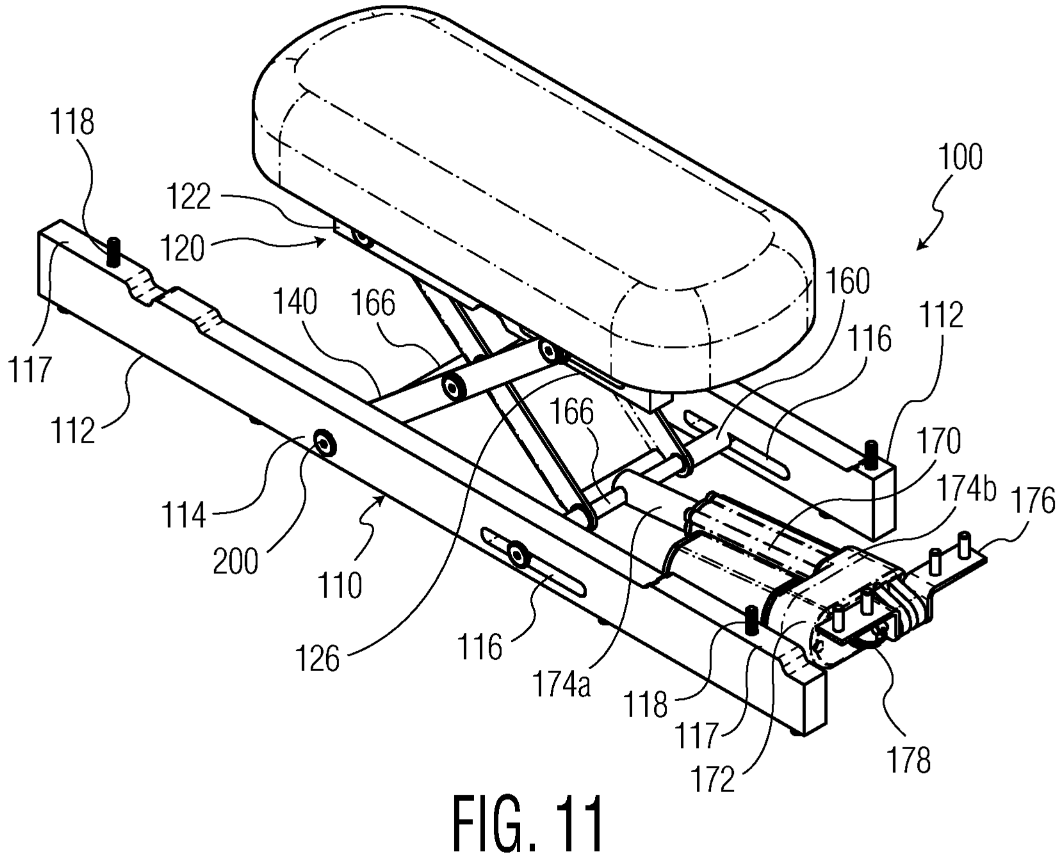
FIG. 11 is a perspective view of another control assembly according to the present invention.

As shown in FIG. 11, the lifting mechanism 170 includes a motor 172, an actuator 174, and an attachment support 176. The motor 172 may be an electronic or hydraulic known to the art. The actuator 174 includes an elongated rigid rod shaped support 174*a* having a slide receiving section 174*b*. The actuator 174 connects to the motor 172. The attachment support 176 includes a bracket 178 having plurality of fastener receiving passageways (not shown). The attachment support 176 connects to the motor 172 and the actuator 174 in the shown embodiment. However, one skilled in the art should appreciate that other design and configurations are possible.

Figure 12:
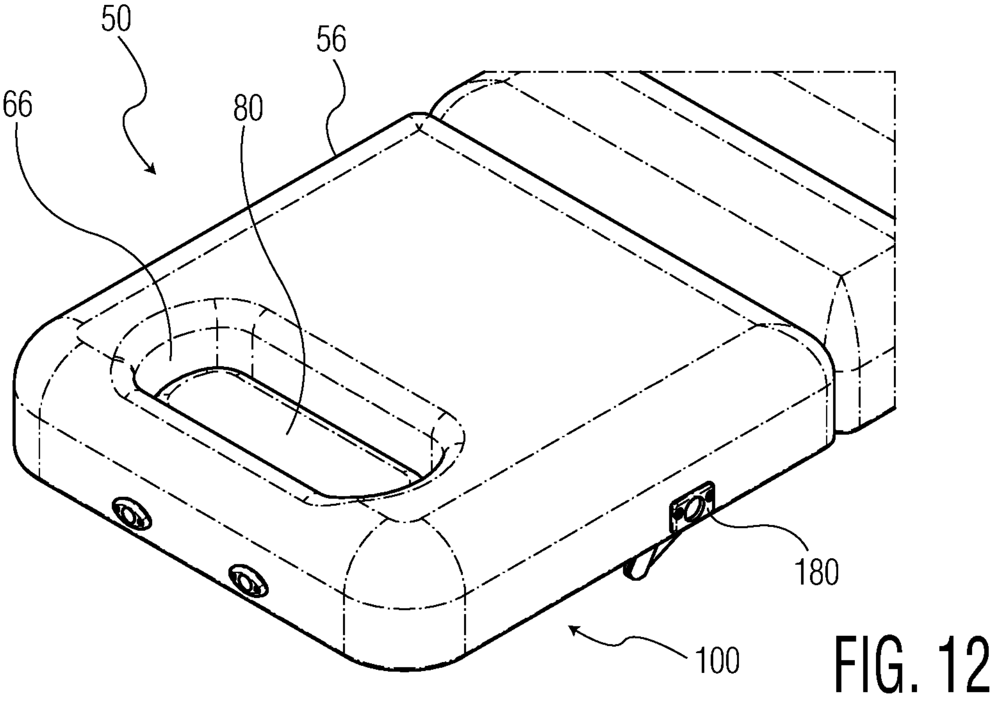
FIG. 12 is a perspective view of another support platform having the control assembly of FIG. 11.

With reference to FIG. 12, the control mechanism 180 is a control device connected to the lifting mechanism 170. In the shown embodiment, the control mechanism is a button positioned on the support platform 50. However, one skilled in the art should appreciate that other designs are possible. For instance, the control mechanism 180 may be a lever or control panel with a plurality of buttons.

Now, with respect to FIGS. 11 through 16, assembly of the control assembly 100 for the support platform 50 will be described.

The lower support structure 110 is positioned below the upper support platform 120. The outer extension arms 142 and the inner extension arms 152 are positioned in a scissor-type manner.

The middle rotation support 164 is positioned between the inner extension arms 152 and the outer extension arms 142 and corresponds with the middle pivot receiving sections 146, 156. One outer extension arm 142 is rotatably connected to one inner extension arm 152 using a fastener 200 positioned through the middle pivot receiving section 146, 156, respectively. The other outer extension arm 142 is rotatably connected to the other inner extension arm 152 using another fastener 200 positioned through the middle pivot receiving section 146, 156, respectively.

The upper rotation support 162 is positioned between the inner extension arms 152 in order to correspond with the end pivot receiving sections 154 and the upper pivot receiving passageway 124. A fastener 200 rotatably connects the inner extension arms 152 and the upper rotation support 162 about the upper support arms 122.

The lower rotation support 163 is positioned between the outer extension arms 1422 in order to correspond with the end pivot receiving sections 146 and the lower pivot receiving passageway 114. A fastener 200 rotatably connects the outer extension arms 142 and the lower rotation support 163 about the lower support arms 112.

The upper slide support 166 is positioned between the outer extension arms 142 in order to correspond with the slide receiving sections 148 and the upper slide groove 126. A fastener 200 rotatably connects the outer extension arms 142 and the upper slide support 166 about the upper support arms 122 such that the upper slide support 166 moves linearly along the upper slide groove 126.

The slide receiving section 174*b* receives the lower slide support 168 about a middle portion thereof in the shown embodiment. Next, the lower slide support 168 is positioned between the inner extension arms 152 in order to correspond with the slide receiving sections 158 and the lower slide groove 116. A fastener 200 rotatably connects the inner extension arms 152 and the lower slide support 168 about the lower support arms 112 such that the lower slide support 168 moves linearly along the lower slide groove 116.

The upper support structure 120 is then connected to the cushion 80 using the support fasteners 128 that are positioned through the upper fastener receiving passageways 127 and secured to the cushion 80. The cushion 80 is then positioned within the guide passageway 66. Then, the lower support structure 110 is then connected to the body pad 56 using the support fasteners 118 that are positioned through the lower fastener receiving passageways 117 and secured to the body pad 56.

The motor 172 is connected to the actuator 174 and the attachment support 176 is rotatably connected to the motor 172 and/or the actuator 174 using a hinge joint (not shown). The bracket 178 is then secured to the body pad 56. The control mechanism 180 is positioned on the body 56 in the embodiment shown and electrically connects to the motor 172.

Now, with respect to FIGS. 11 through 16, actuation of cushion 80 using the control assembly 100 for the support platform 50 will be described.

In order to adjust the height of the 80 cushion within the guide passageway 66, a user activates the motor 170 using the control mechanism 180. The motor 170 moves the actuator 174, which then moves the lower slide support 168 linearly along the lower slide receiving groove 116. As the lower slide support 168 moves linearly in the lower slide receiving groove 116, the outer inner extension arms 142 and inner extension arms 152 pivot about the middle pivot receiving sections 146, 156, and the upper slide support 166 moves linearly along the upper slide receiving groove 126. The upper support structure 120 moves horizontally toward and away the lower support structure 110. In accordance, an upper surface of the cushion 80 moves along the guide passageway 66, such that the cushion can be moved above or below an upper surface of the body pad 56.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A support platform for body treatment comprising:
- a supporting frame;
- a resilient pad having an upper surface and a lower surface attached to the supporting frame;
- a guide passageway in the resilient pad opening into the upper surface of the resilient pad;
- a cushion positioned in and movable along the guide passageway; and
- a control assembly connected to the cushion and moveable about the guide passageway to control the position of the cushion in the guide passageway to accommodate receiving of a human breast, the control assembly includes an upper support structure connected to the cushion.

2. The support platform of claim 1, wherein the control assembly includes a lower support structure connected to the upper support structure through a plurality of extension arms.

3. The support platform of claim 2, wherein the plurality of extension arms includes a pair of outer extension arms and a pair of inner extension arms.

4. The support platform of claim 3, wherein each of the pair of outer extension arms includes an end pivot receiving section, a middle pivot receiving section, and a slide receiving section.

5. The support platform of claim 4, wherein the plurality of extension arms pivot about the middle pivot receiving section.

6. The support platform of claim 5, wherein the end pivot receiving section pivots about the lower support structure of the control assembly.

7. The support platform of claim 6, wherein the slide receiving section pivots about a lower slide receiving groove of the lower support structure.

8. The support platform of claim 7, further comprising a lower slide support positioned between the pair of outer extension arms and corresponding with the slide receiving section of each outer extension arm.

9. The support platform of claim 3, wherein each of the pair of inner extension arms includes a slide receiving section.

10. The support platform of claim 9, wherein the slide receiving section of the inner section pivots about an upper slide receiving groove of the upper support structure of the control assembly.

11. The support platform of claim 10, further comprising an upper slide support positioned between the pair of inner extension arms and corresponding with the slide receiving section of the pair of lower support arms of the control assembly.

12. The support platform of claim 2, wherein the lower support structure of the control assembly is connected to the lower surface side.

13. The support platform of claim 12, wherein each of the pair of lower support arms include a lower slide receiving groove.

14. The support platform of claim 13, wherein the upper support structure of the control assembly includes a pair of upper support arms.

15. The support platform of claim 14, wherein each of the pair of upper support arms of the upper support structure includes an upper slide receiving groove.

16. The support platform of claim 15, wherein the upper slide receiving groove of the of the pair of upper support arms of the upper support structure is an elongated groove extending along a length of the upper support structure of the control assembly.

17. The support platform of claim 16, wherein the upper slide receiving groove extends from an inner surface side to an outer surface side of the upper support structure of the control assembly.

18. The support platform of claim 14, wherein a length of the pair of upper support arms of the upper support structure is smaller than a length of the pair of lower support arms of the lower support structure.

19. The support platform of claim 13, wherein each lower slide receiving groove of the pair of lower support arms is an elongated groove extending along a length of each pair of lower support arms.

20. The support platform of claim 19, wherein each lower slide receiving groove extends from an inner surface side to an outer surface side of the lower support structure of the control assembly.

21. The support platform of claim 12, wherein the lower support structure of the control assembly includes a pair of lower support arms.

* * * * *